United States Patent [19]
Neilson et al.

[11] Patent Number: 5,150,967
[45] Date of Patent: Sep. 29, 1992

[54] MILKSHAKE MACHINE

[75] Inventors: Jim L. Neilson, 1021 Santa Cruz Way, Rohnert Park, Calif. 94928; Demont Neilson, Grass Valley, Calif.

[73] Assignees: Jim L. Neilson, Elk Grove; Josefa N. Neilson, San Diego, both of Calif.

[21] Appl. No.: 784,631

[22] Filed: Oct. 25, 1991

Related U.S. Application Data

[63] Continuation of Ser. No. 220,584, Jul. 18, 1988, abandoned.

[51] Int. Cl.5 .............................. B01F 7/00; B01F 7/16
[52] U.S. Cl. .................................... 366/206; 366/197; 366/261; 366/286; 366/289; 366/331
[58] Field of Search .............. 366/197, 199, 206, 261, 366/285, 286, 289, 331, 332, 347; 99/348; 74/44

[56] References Cited

U.S. PATENT DOCUMENTS

| | | |
|---|---|---|
| 496,674 | 5/1893 | Urbach . |
| 934,537 | 9/1909 | Johnson ............................. 366/332 |
| 1,313,830 | 8/1919 | Minsk ................................. 366/286 |
| 2,026,240 | 12/1935 | Luxmore ........................... 366/206 |
| 2,115,809 | 5/1938 | Goldman . |
| 2,701,131 | 2/1955 | Love . |
| 2,898,094 | 8/1959 | O'Neil . |
| 2,967,433 | 1/1961 | Phillips ............................. 366/285 |
| 3,171,635 | 3/1965 | Haentjens et al. .................. 366/286 |
| 3,295,997 | 1/1967 | Tomlinson . |
| 3,514,080 | 5/1970 | Price et al. ......................... 366/206 |
| 4,169,681 | 10/1979 | Kato . |
| 4,358,298 | 11/1982 | Ratcliff ............................. 366/286 |
| 4,544,277 | 10/1985 | Schnellmann ..................... 366/78 |
| 4,708,487 | 11/1987 | Marshall ............................ 366/206 |

FOREIGN PATENT DOCUMENTS 2158002  5/1973  Fed. Rep. of Germany ...... 366/289

Primary Examiner—Timothy F. Simone

[57] ABSTRACT

A machine specifically for making milkshakes and malts out of hard ice-cream in sixty seconds or less. The ice-cream and ingredients are placed in a container that can be locked and sealed to the underside of a housing designed especially for that purpose. Inside the housing are two gearmotors—one is used to rotate a shaft and mixing head at a given R.P.M. and torque. This gearmotor, with shaft and mixing head, is positioned vertically above the container and supported between two diametrically opposed rods, in a manner that permits easy vertical movement of the mixing head within the container. A second gearmotor provides the necessary R.P.M. and torque for this vertical movement. Secured to a mounting plate in the upper part of the housing; this second gearmotor, is linked to the first gearmotor by means of a rotor arm and rod member connected to a stud on the first gearmotor. As the rotor arm on the second gearmotor rotates, it moves the first gearmotor, shaft and mixing head in a vertical, oscillatory motion. Both motors may operate simultaneously or independently.

9 Claims, 2 Drawing Sheets

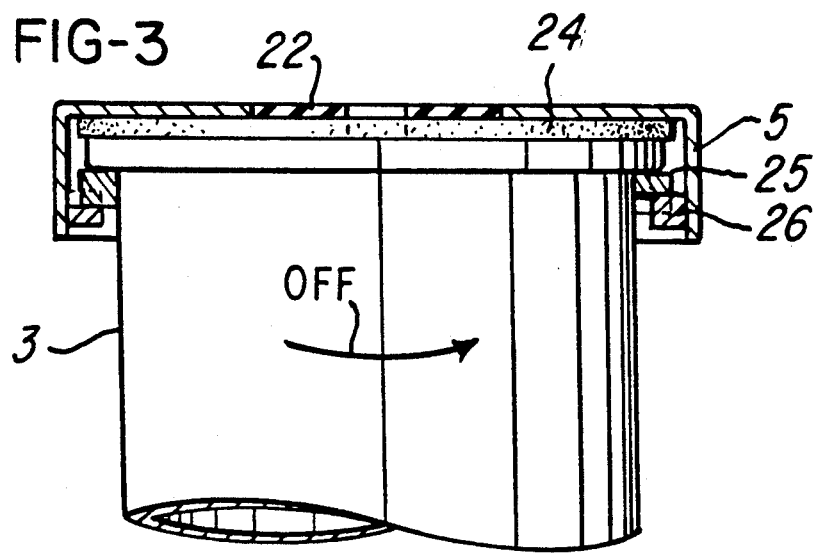
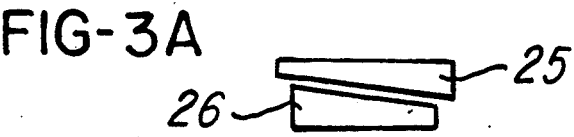
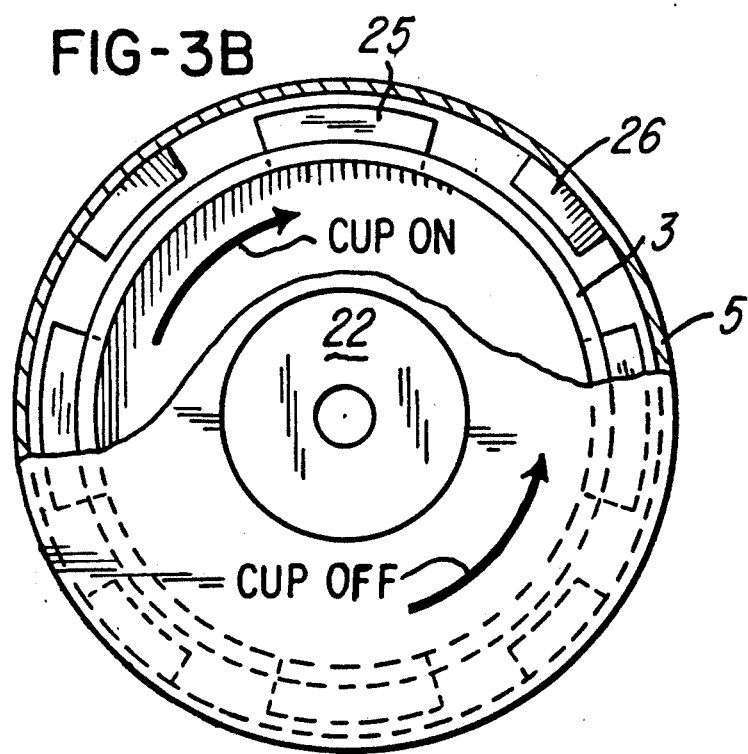

MILKSHAKE MACHINE

This is a continuation of copending application Ser. No. 07/220,584 filed on Jul. 18, 1988, now abandoned.

BACKGROUND OF THE INVENTION

1. Field of Invention

This invention relates to milkshake machines, especially to milkshake machines for use in mixing thick hard ice cream shakes.

2. Description of the Prior Art

Many consumers of milkshakes or malts prefer that they be made from hard ice-cream and be of medium to thick consistency. As a result, the mixing of this type of milkshake has created many problems with the existing prior art milkshake machines.

Milkshake machines known in the prior art consist of an electric motor, shaft, and mixing disc. This device is supported on a stand or hangs from a wall bracket. Making a hard ice-cream milkshake involves holding a metal cup under the revolving shaft and disc while manually manipulating the cup vertically and in a stirring motion which achieves only a partial mixture. This mixture may contain foreign matter as a result of the mixing head coming in contact with the sides of the cup. From a commercial standpoint, this method is time-consuming, inefficient and sometimes aggravating.

Most users, therefore, would find it desirable to have a machine that would facilitate easy and even mixing in a minimal amount of time, require no attending, and eliminate spills and splatters. However, the only milkshake machines on the market today are the same inadequate devices that have been on the market for years, with very little improvement.

SUMMARY OF THE INVENTION

An object of this invention is to provide an improved rotary type mixer adapted for the sole purpose of blending hard ice-cream into milkshakes. Hard ice-cream is primarily a solid substance and therefore requires particular application of mechanics for proper blending.

A further object of this invention is to provide an improved rotary type mixer with the necessary power, revolutions per minute and vertical movement as to completely blend hard ice-cream and ingredients within a time frame of sixty seconds or less.

A further object of this invention is to provide an improved rotary type mixer with a means of raising and lowering a power motor on guide shafts at a pre-determined speed and torque.

A further object of this invention is to provide a specially constructed mixing cup that can be attached and removed from the machine in a quick and simple manner.

A further and primary object of this invention is to provide an improved rotary type mixer that will alleviate all prior art problems relevant to the making of milkshakes out of hard ice-cream; that is to say, according to this invention:

1. Attachment and removal of the mixing cup from the machine is quick and simple.
2. Once cup is attached, further attention is not required, and the attendant may leave the machine to do other chores.
3. Quality and clean mixing in less than 60 seconds—a most important feature in a busy establishment.
4. No aggravation from spilled or splattered milkshakes.

BRIEF DESCRIPTION OF THE DRAWINGS

FIG. 3 is a fragmentary front elevational view, with parts in cross section, of a mixing cup and a cap for the mixing cup that are parts of the milkshake machine of this invention. FIG. 3 is on a scale larger than FIGS. 1 and 2.

FIG. 3A is a diagrammatic side elevational view of a pair of locking bars forming parts of the mixing cup and the cap of FIG. 3.

FIG. 3B is a top plan view, with parts broken away, of the cap and the mixing cup of FIG. 3.

DESCRIPTION OF THE PREFERRED EMBODIMENT

Figure 1:
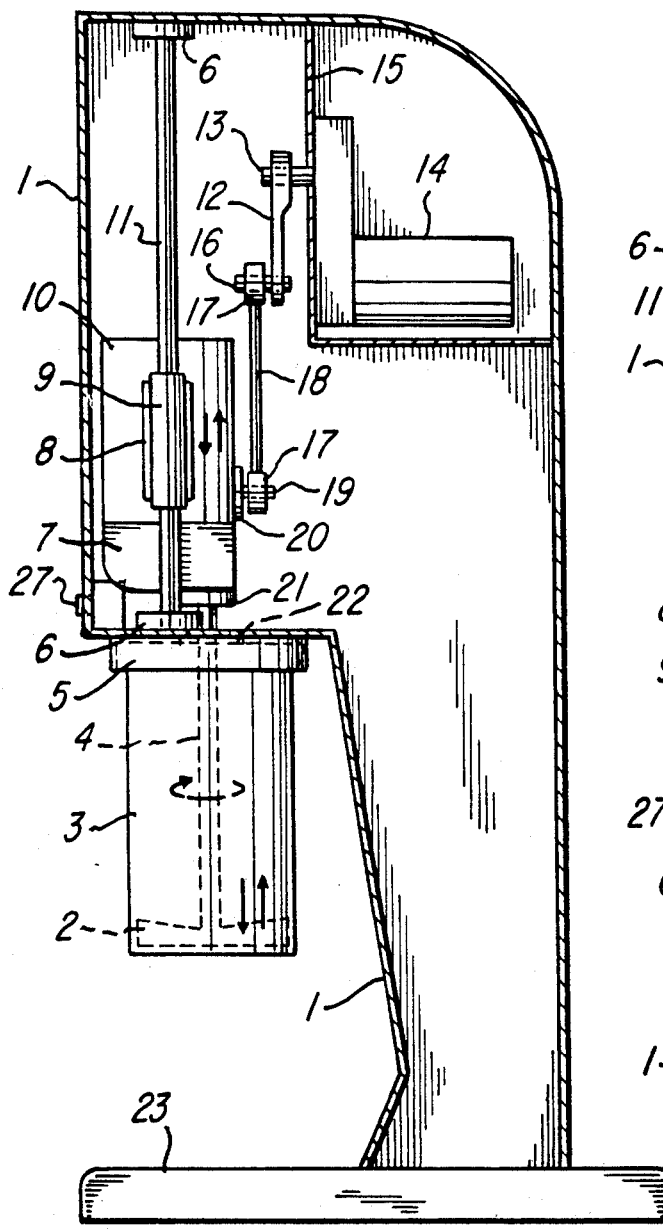
FIG. 1 is a side elevational view, with parts shown in cross section, of a milkshake machine made in accordance with this invention.
Figure 2:
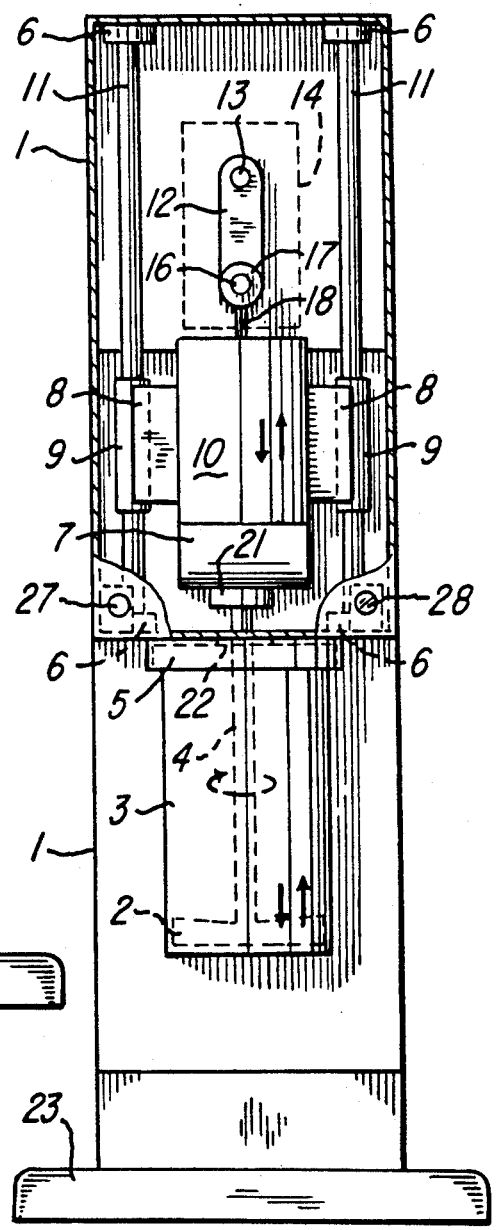
FIG. 2 is a front elevational view, with parts in cross section, of the milkshake of FIG. 1.

FIG. 1 illustrates a complete housing 1 with access panels removed. Mixing shaft 4, gearbox 7, bearing supports 8, bearings 9, motor 10, stud 19, stud mounting plate 20 and thrust bearing 21, comprise an integral unit mounted between two diametrically opposed stainless steel vertical guide rods 11 anchored at each end by rod supports 6, also an integral part of housing 1. Vertical control arm 12 is locked to gearmotor shaft 13 with a keyed spline and setscrew and welded to stud 16 at opposite end of arm 12. Connecting rod 18 is linked to stud 16 and motor stud 19 by means of self-aligning bearing 17 screwed to each end of rod 18. Mixing head 2 is screwed on counter to the rotation of shaft 4 to ensure a tightening effect as it tends to resist contents of mixing cup 3. Locking cap 5 is also an integral part of housing 1 and including a non-toxic gasket 24 and a removal non-toxic grommet type shaft seal 22. With reference to FIGS. 3, 3A and 3B, a mixing cup or container 3 having plural, circumferentially-spaced and outwardly-projecting locking bars 26 is placed on the locking cap 5. As best shown in FIG. 3A, the locking bars 25 have sloping surfaces adapted to interengage with cooperating sloping surfaces on a corresponding set of locking bars 26 that project inwardly from the inside of the skirt of the locking cap 5. By rotating the cup 3 as indicated by the arrows in FIGS. 3 and 3A, the top of the cup 3 is sealed to the cap 5. With reference to FIGS. 3, 3A and 3D mixing cup 3 is rotated one-quarter turn into locking cap 5 in the same direction as the rotation of shaft 4 to ensure a tightening effect as shaft 4 and mixing head 2 tend to move with the contents of the cup.

Two gearmotors are used in this invention to simplify the wide ratio necessary between rotary and vertical movement. Gearmotor 10 rotates at 480 R.P.M., while gearmotor 14 rotates at 6 R.P.M. It would be practically impossible to achieve this eighty-to-one ratio using any other system and remain within the confines of physical and torque requirements.

Gearmotor 10 which includes gearbox 7, shaft 4 and mixing head 2, is secured firmly to guide rods 11 by means of bearings 9 welded to bearing supports 8, which in turn are welded to motor 10; thus allowing free vertical movement along the trajectory of guide rods 11 which are secured firmly to supports 6 - an integral part of housing 1. Gearmotor 14 bolted firmly to support plate 15, provides a six inch vertical movement within mixing cup 3 by the rotating action of vertical control arm 12 connected to gearmotor 10 by means of bearings 17 and rod 18. Gearmotor 10 provides the necessary R.P.M. and torque for quick, efficient blending of mixing cup contents, namely, hard ice-cream and ingredients. Mixing head 2 must be in the up position to facilitate attachment of mixing cup 3 by rotating one-quarter turn counter clockwise within cap 5, an integral part of housing 1 (see drawings FIG. 3). With both gearmotors 10 and 14 energized, the rotating action of vertical control arm 12 begins the six-inch vertical movement within mixing cup 3 by moving motor 10 up and down at a rate of 1.2 inches per second while mixing head 2 rotates at four hundred eighty R.P.M. This equals a rotary to vertical ratio of eighty to one, which was determined by extensive experimentation to be ideal for the purposes described herein. (Vertical control arm 12 is three inches long on shaft centers and rotates at six R.P.M. Therefore, 1 R.P.M. is equal to a vertical movement of six inches down and six inches up times six R.P.M., for a total of seventy-two inches of vertical movement in sixty seconds or 1.2 inches in one second.) Each time mixing shaft 4 returns to the up position, it is wiped clean by the action of seal 22; also, at this time, an indicator light 27 is energized and the machine may be switched off by a power switch 29 for quick and easy removal of cup 3 and contents.

The physical dimensions of the preferred embodiment are as follows:

Housing 1 is 26¾ inches high by 6½ inches wide by 10½ inches deep.

Housing base 23 is 1¼ inches high by 12 inches wide by 14 inches deep.

Bottom surface of mixing cup 3 is 5 inches above base and 7 inches below top of locking cap 5.

Top of locking cap 5 is 13½ inches from top of housing.

Mixing cup 3 is 3½ inches in diameter.

The following table sets forth differences between a milkshake machine incorporating this invention and prior art milkshake machines:

|  | THIS INVENTION | PRIOR ART |
| --- | --- | --- |
| Shaft Rotation | 400 to 650 RPM | 8,000 to 18,000 RPM |
| Vertical Shaft Movement | Yes | No |
| Motor | Dual (High Torque) | One (Very Low Torque) |
| Mixing Cup | New Design Locked in position Sealed or closed unit | Does not lock in position Open cup (spills) |
| Mixing Head | Flat bar Never comes in contact with cup | Small circular disc Occasionally comes in contact with cup when manually mixing |
| Attendant required | No | Yes (To prevent cup from spinning and for mixing) |
| Mixing time | Less than 60 | 4 to 8 minutes |
| (Thick Shakes) | seconds | |

We claim:
1. An apparatus for blending ingredients comprising:
   a) a housing;
   b) a pair of mutually spaced vertical guide rods fixed in said housing;
   c) a first motor slidably mounted on said guide rods by slider bearings such that said first motor may freely move up and down along said guide rods;
   d) a mixing shaft including a mixing head drivingly connected to said first motor and movable up and down with said first motor;
   e) a second motor operable simultaneously with said first motor mounted to said housing, said second motor including a drive shaft; and
   f) means coupling said drive shaft of said second motor to said first motor such that rotation of said second motor drive shaft causes said first motor to slide up and down on said guide rods while said mixing shaft is rotatably driven by said first motor.

2. An apparatus according to claim 1 wherein said coupling means includes an arm connected to said drive shaft of said second motor and a connecting member, said connecting member being attached to said first motor and said arm, respectively, by means of studs and bearings.

3. An apparatus according to claim 1 wherein said first motor and said mixing shaft have a vertical movement of at least six inches during operation of said first motor and said second motor.

4. An apparatus according to claim 1 wherein said first motor rotates said mixing shaft at between about 400 to about 650 rotations per minute.

5. An apparatus according to claim 1 wherein said first motor rotates said mixing shaft at about 480 rotations per minute.

6. An apparatus according to claim 1 wherein said drive shaft of said second motor rotates at about 6 rotations per minute.

7. An apparatus according to claim 1 wherein said first motor is driven by said second motor to move up and down at a rate of about 1.2 inches per second.

8. An apparatus according to claim 1 further comprising a mixing container and said apparatus having a locking cap through which said mixing shaft extends and which is adapted to seal the upper end of said mixing container such that, upon forming a seal, the lower end of said mixing shaft is contained within said mixing container.

9. An apparatus according to claim 8 wherein said mixing container and said locking cap have interengaging surfaces used to seal the upper end of said mixing container.

* * * * *